(12) United States Patent
Takeshima

(10) Patent No.: US 11,801,648 B2
(45) Date of Patent: Oct. 31, 2023

(54) METHOD OF MANUFACTURING MAGNET AND METHOD OF MANUFACTURING ROTOR

(71) Applicant: TOYOTA JIDOSHA KABUSHIKI KAISHA, Toyota (JP)

(72) Inventor: Kenta Takeshima, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 92 days.

(21) Appl. No.: 17/443,156

(22) Filed: Jul. 21, 2021

(65) Prior Publication Data

US 2022/0024141 A1  Jan. 27, 2022

(30) Foreign Application Priority Data

Jul. 27, 2020 (JP) .................. 2020-126533

(51) Int. Cl.
*B29C 65/02* (2006.01)
*B29C 65/00* (2006.01)
(Continued)

(52) U.S. Cl.
CPC ............ *B29C 65/02* (2013.01); *B29C 66/729* (2013.01); *H02K 1/04* (2013.01); *H02K 1/276* (2013.01);
(Continued)

(58) Field of Classification Search
CPC .............. B29C 66/729; B29C 66/7212; B29C 66/7392; B29C 66/8322; B29C 66/71; B29C 66/81431; B29C 66/1122; B29C 66/45; B29C 66/721; B29C 66/74283; B29C 65/02; H02K 15/024; H02K 1/04; H02K 1/276; H02K 1/2766; H02K 15/03; B29K 2309/08; B29K 2079/085;
(Continued)

(56) References Cited

U.S. PATENT DOCUMENTS 4,678,954 A * 7/1987 Takeda ............... H02K 1/278
29/598
9,413,199 B2 * 8/2016 Arimatsu ............ H02K 1/278
(Continued)

FOREIGN PATENT DOCUMENTS

| JP | 2002118009 A | 4/2002 |
| JP | 2012244838 A | 12/2012 |
| JP | 2019137965 A | 8/2019 |

*Primary Examiner* — Alex W Mok
(74) *Attorney, Agent, or Firm* — Hunton Andrews Kurth LLP

(57) ABSTRACT

A sheet-shaped insulating member including a thermoplastic resin fiber and an inorganic fiber is arranged on a surface of a magnet body. The insulating member is compressed while being heated to a temperature higher than or equal to a glass transition temperature of the thermoplastic resin fiber, so that the insulating member is thermocompression-bonded to the magnet body in a state in which the inorganic fiber is elastically compressed. A magnet is thus formed. With the magnet arranged in a slot of a rotor core, the magnet is heated to a temperature higher than or equal to the glass transition temperature of the thermoplastic resin fiber. This causes the inorganic fiber to restore elasticity, so that the magnet is fixed to the rotor core.

2 Claims, 3 Drawing Sheets

(51) Int. Cl.
    *H02K 1/04*         (2006.01)
    *H02K 1/27*         (2022.01)
    *H02K 15/02*      (2006.01)
    *H02K 15/03*      (2006.01)
    *H02K 1/276*      (2022.01)
    *B29K 701/12*     (2006.01)

(52) U.S. Cl.
    CPC ........... *H02K 15/024* (2013.01); *H02K 15/03* (2013.01); *B29K 2701/12* (2013.01); *B29K 2713/00* (2013.01); *B29K 2995/0007* (2013.01); *B29K 2995/0008* (2013.01)

(58) Field of Classification Search
    CPC ........ B29K 2995/0008; B29K 2713/00; B29K 2995/0007; B29K 2701/12; B29L 2031/3406
    USPC .................................................... 310/156.01
    See application file for complete search history.

(56) References Cited

U.S. PATENT DOCUMENTS

| | | | |
|---|---|---|---|
| 9,680,342 B2 * | 6/2017 | Arimatsu | H02K 1/28 |
| 9,782,953 B2 * | 10/2017 | Peng | B32B 37/10 |
| 10,320,249 B2 * | 6/2019 | Okamoto | H02K 1/32 |
| 10,326,342 B2 * | 6/2019 | Kino | H02K 1/2706 |
| 2002/0036031 A1 | 3/2002 | Sakaki et al. | |
| 2014/0062251 A1 * | 3/2014 | Arimatsu | H02K 1/28 |
| | | | 310/216.004 |
| 2014/0327329 A1 * | 11/2014 | Kitada | H02K 1/2766 |
| | | | 310/43 |
| 2016/0152003 A1 * | 6/2016 | Peng | B32B 38/0036 |
| | | | 156/580 |
| 2016/0271865 A1 * | 9/2016 | Iwano | B29C 66/322 |
| 2017/0187258 A1 * | 6/2017 | Fujikawa | H02K 15/03 |
| 2018/0130581 A1 * | 5/2018 | Fujikawa | H01F 41/0273 |
| 2018/0248453 A1 * | 8/2018 | Nakayama | H02K 1/28 |
| 2019/0173337 A1 * | 6/2019 | Shimokawa | H02K 15/03 |
| 2020/0001546 A1 * | 1/2020 | Furukawa | B29C 66/742 |
| 2020/0185989 A1 * | 6/2020 | Saigusa | H02K 1/278 |

* cited by examiner

METHOD OF MANUFACTURING MAGNET AND METHOD OF MANUFACTURING ROTOR

CROSS-REFERENCE TO RELATED APPLICATION

This application claims priority to Japanese Patent Application No. 2020-126533 filed on Jul. 27, 2020, incorporated herein by reference in its entirety.

BACKGROUND

1. Field

The present discloser relates to a method of manufacturing a magnet and a method of manufacturing a rotor.

2. Description of Related Art

Japanese Laid-Open Patent Publication No. 2002-118009 discloses a magnet for a motor. This magnet includes a magnet body, which is a sintered magnet, and an insulating coating that is made of a plastic and stacked on the magnet body.

When the above described magnet is used in the rotor of a motor, the magnet is inserted into a slot of the rotor. To allow the magnet to be smoothly inserted into the slot, the dimensions of the magnet are slightly smaller than the dimensions of the slot. The magnet is then fixed to the rotor. To fix the magnet to the rotor, for example, adhesive is applied to the rotor and cured. Alternatively, plastic is applied to the entire rotor including the magnet and cured. Thus, the magnet disclosed in Japanese Laid-Open Patent Publication No. 2002-118009 requires troublesome processes to be fixed to a rotor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a method of manufacturing a magnet is provided. The magnet includes a magnet body having a surface covered with an insulating member. The method includes: an arrangement step that arranges, on the surface of the magnet body, the sheet-shaped insulating member including a thermoplastic resin fiber and an inorganic fiber; and a thermocompression step that compresses the insulating member while heating the insulating member to a temperature higher than or equal to a glass transition temperature of the thermoplastic resin fiber, thereby thermocompression-bonding the insulating member to the magnet body in a state in which the inorganic fiber is elastically compressed.

In a second general aspect, a method of manufacturing a rotor is provided. The rotor includes a rotor core having a slot, and a magnet that is arranged in the slot and includes a magnet body having a surface covered with an insulating member. The method includes: an arrangement step that arranges, on the surface of the magnet body, the sheet-shaped insulating member including a thermoplastic resin fiber and an inorganic fiber; a thermocompression step that compresses the insulating member while heating the insulating member to a temperature higher than or equal to a glass transition temperature of the thermoplastic resin fiber, thereby thermocompression-bonding the insulating member to the magnet body in a state in which the inorganic fiber is elastically compressed, so as to form the magnet; and a fixing step that heats the magnet arranged in the slot to a temperature higher than or equal to the glass transition temperature, thereby restoring elasticity of the inorganic fiber, so as to fix the magnet to the rotor core.

In a third general aspect, a magnet includes a magnet body and a sheet-shaped insulating member including a thermoplastic resin fiber and an inorganic fiber. The insulating members cover a surface of the magnet body. The inorganic fiber is elastically compressed.

In a fourth aspect, a rotor is provided that includes a rotor core having a slot, and a magnet that is arranged in the slot and includes a magnet body having a surface covered with an insulating member. The insulating member includes a thermoplastic resin fiber and an inorganic fiber, and is sheet-shaped. The magnet is fixed to the rotor core in a state in which the insulating member is in contact with an inner surface of the slot.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A rotor 60 and magnets 80 according to one embodiment will be described with reference to the drawings.

First, a schematic configuration of a motor 50 will be described.

Figure 1:
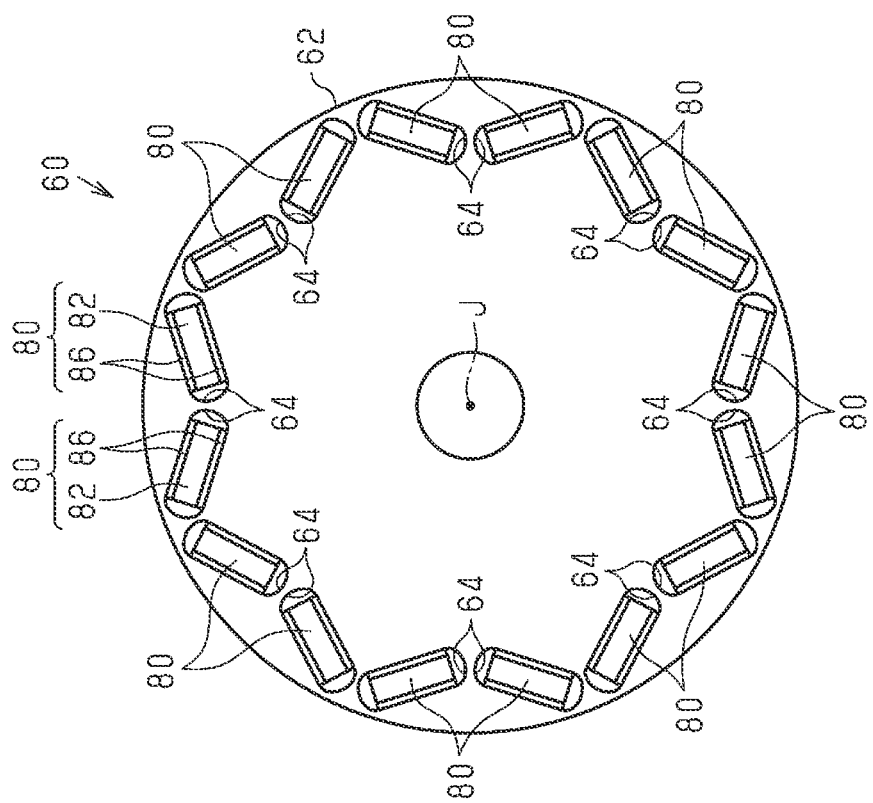
FIG. 1 is a cross-sectional view of a motor.

As shown in FIG. 1, the motor 50 includes a shaft 55, which has a columnar shape as a whole. The central axis J of the shaft 55 coincides with the rotation axis J of the motor 50. In the present description, any line that coincides with the central axis J of the shaft 55 is also represented by the symbol J.

The rotor 60, which has a cylindrical shape as a whole, is arranged on the radially outer side of the shaft 55. The rotor 60 includes a rotor core 62, which has a cylindrical shape as a whole. Although not illustrated, the rotor core 62 is formed by stacking magnetic steel sheets, which are formed to have a circular annular shape, in the direction of the central axes. The shaft 55 is inserted into the central hole of the rotor core 62. The rotor core 62 is arranged to be coaxial with the shaft 55. The inner circumferential surface of the rotor core 62 is fixed to the outer circumferential surface of the shaft 55.

The rotor core 62 has slots 64. The slots 64 are through-holes that extend through the rotor core 62 in the direction of the central axis J. The slots 64 are located in the vicinity of the outer circumferential surface of the rotor core 62. The slots 64 are arranged at intervals in the circumferential direction of the rotor core 62.

Figure 2:
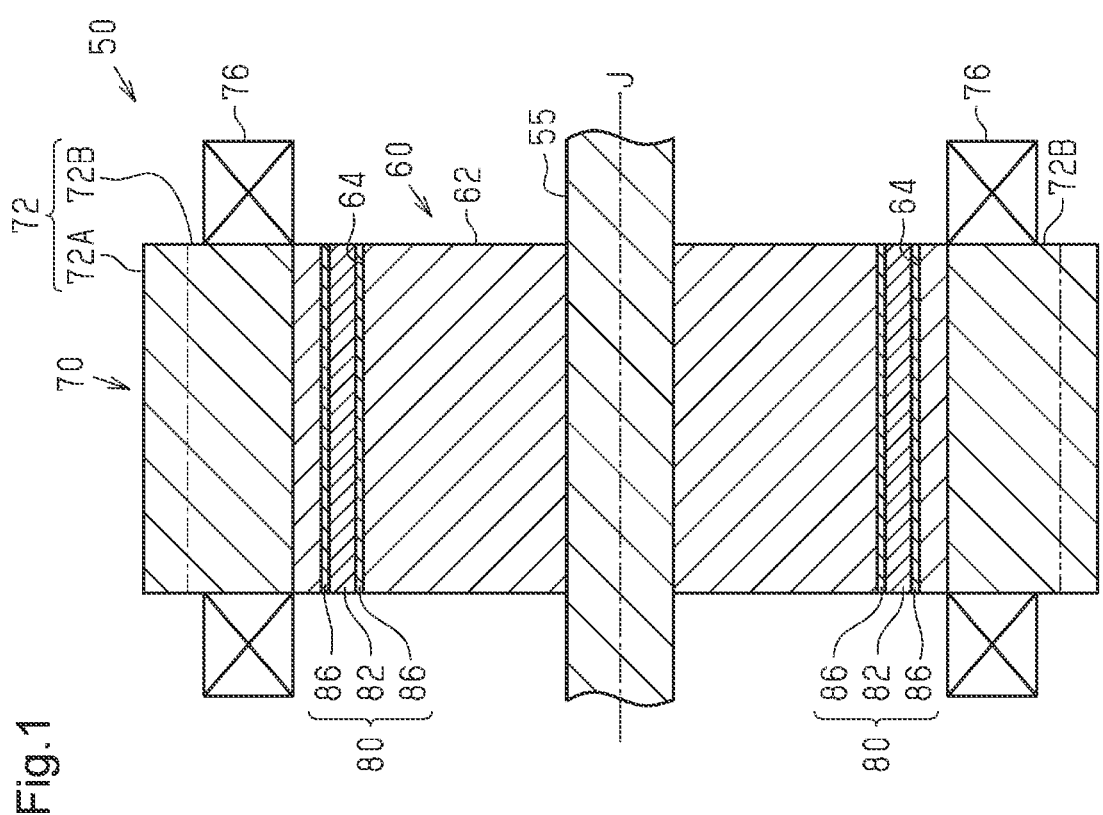
FIG. 2 is a plan view of a rotor.

As shown in FIG. 2, the slots 64 are substantially rectangular in a plan view in the direction of the central axis J of the rotor core 62. When two of the slots 64 that are adjacent to each other in the circumferential direction are regarded as a pair, eight pairs of slots 64 are provided. The two slots 64 of each pair are arranged to form the letter V in a plan view. Specifically, the two slots 64 in each pair are arranged such that the distance in the circumferential direction decreases toward the inner ends in the radial direction of the rotor core 62.

Each slot 64 receives one of the magnets 80. Each magnet 80 includes a body (hereinafter, referred to as magnet body) 82, which includes a permanent magnet. In the present embodiment, the magnet body 82 is a neodymium magnet, which is made of materials including iron, neodymium, and boron. As shown in FIGS. 1 and 2, the magnet bodies 82 each have the shape of a rectangular plate. The surfaces of each magnet body 82 are not curved but flat.

The opposite surfaces of the plate-shaped magnet body 82 are covered with sheet-shaped insulating members 86. Each insulating member 86 is a sheet of nonwoven fabric made of polyetherimide fiber, which is thermoplastic resin fiber, and glass fiber, which is inorganic fiber. In FIGS. 1 to 6, the thickness of each insulating member 86 is exaggerated. In FIG. 2, some of the magnets 80 are provided with the reference numerals for the magnet bodies 82 and the insulating members 86.

The outer shape and dimensions of each magnet 80 are generally the same as the outer shape and dimensions of each magnet body 82 That is, each magnet 80 has the shape of a rectangular plate as a whole. With reference to FIG. 2, in a plan view in the direction of the central axis J of the rotor core 62, a direction perpendicular to the longitudinal direction of each slot 64 is defined as a width direction of the slot 64. In this case, the thickness of each magnet 80 including the insulating members 86 is substantially equal to the dimension of each slot 64 in the width direction. Each magnet 80 is fixed in the corresponding slot 64 with the insulating members 86 on the opposite surfaces contacting the inner surfaces in the width direction of the slot 64. As shown in FIG. 1, in a side view of the rotor core 62, the dimension of each magnet 80 in a direction along the long sides is substantially equal to the dimension of each slot 64 in the direction of the central axis J of the rotor core 62. In the direction of the central axis J of the rotor core 62, the opposite ends in the direction along the long sides of each magnet 80 agree with the opposite ends of each slot 64. Also, as shown in FIG. 2, in a plan view of the rotor core 62, the dimension in the longitudinal direction of each magnet 80 is less than the dimension in the longitudinal direction of each slot 64. Thus, each magnet 80 is arranged in the corresponding slot 64 with clearances from the opposite inner surfaces in the longitudinal direction of the slot 64.

The two magnets 80 arranged in the corresponding pair of the slots 64, as shown in FIG. 2, form one of the magnetic poles of the motor 50. That is, the outer surfaces in the radial direction of the two magnets 80 arranged in each pair of the slots 64 are magnetized to have the same polarity. Each pair of the magnets 80 form a magnetic pole, which is a north pole or a south pole. The polarity of the outer surfaces in the radial direction of each pair of the magnets 80 is opposite from that of the magnets 80 in the adjacent pairs. As a result, north poles and south poles are arranged alternately in the circumferential direction of the rotor 60.

As shown in FIG. 1, a stator 70, which has a cylindrical shape as a whole, is arranged on the radially outer side of the rotor 60. The stator 70 includes a stator core 72. The stator core 72 includes a body (hereinafter, referred to as a stator core body) 72A, which has a cylindrical shape. The stator core body 72A is arranged to be coaxial with the rotor 60.

Multiple teeth 72B project radially inward from the inner circumferential surface of the stator core body 72A. In FIG. 1, the boundaries between the stator core body 72A and the teeth 72B are indicated by long-dash double-short-dash lines. The teeth 72B are arranged at equal intervals in the circumferential direction. The projecting end of each tooth 72B is located at a position slightly radially outward of the outer circumferential surface of the rotor 60. In FIG. 1, the clearance between each tooth 72B and the rotor 60 is omitted.

A coil 76 is wound about each tooth 72B. In the direction of the central axis J of the stator core body 72A, each coil 76 reaches positions outward of the opposite ends of the stator core body 72A. That is, each coil 76 projects from the stator core 72 in the direction of the central axis J of the stator core body 72A. When the coils 76 are energized, the rotor 60 and the shaft 55 rotate integrally in the stator 70.

A method of manufacturing the rotor 60 will now be described.

Figure 7:
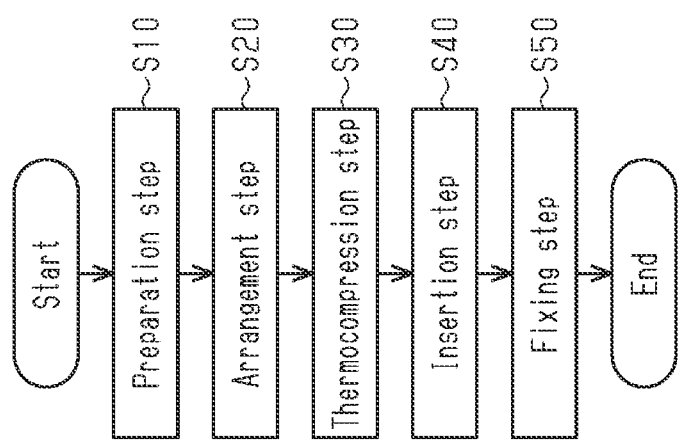
FIG. 7 is a flowchart showing steps for manufacturing a rotor.
Figure 6:
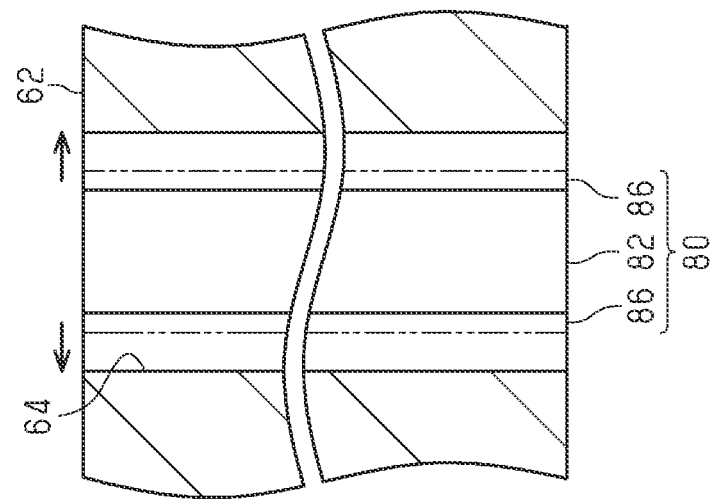
FIG. 6 is an explanatory diagram showing a manner in which insulating members are fixed to a rotor core.

As shown in FIG. 7, a preparation step S10 is first executed when the rotor 60 is manufactured. In the preparation step S10, the rotor core 62, the magnet bodies 82, and the insulating members 86 are prepared. The prepared rotor core 62 and magnet bodies 82 have the shapes as described above. The number of the prepared magnet bodies 82 agrees with the number of the slots 64 in the rotor core 62. That is, sixteen magnet bodies 82 are prepared per rotor core 62. Regarding the insulating members 86, two bands of insulating members 86 that have been rolled up to form two rolls 90 are prepared. The width of each roll 90 is substantially the same as the dimension along the long sides of each magnet body 82.

Figure 3:
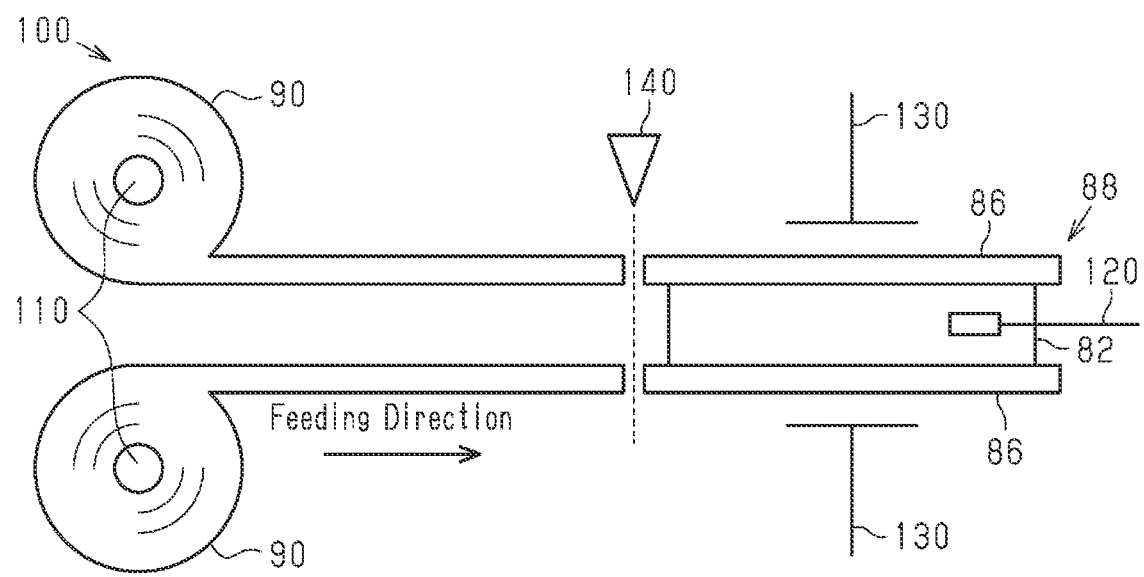
FIG. 3 is an explanatory diagram showing an arrangement step.

After the preparation step S10, an arrangement step S20 is executed to arrange the insulating members 86 on a magnet body 82. As shown in FIG. 3, an arranging apparatus 100 is used in the arrangement step S20. The arranging apparatus 100 includes an unwinding mechanism. The unwinding mechanism includes two upper and lower columnar drums 110. The two drums 110 are arranged such that their central axes are parallel with each other. Each drum 110 is rotatable about the central axis. The two rolls 90, which have been prepared in the preparation step S10, are put on the two drums 110. Although not illustrated, the unwinding mechanism includes movable bodies, to which the ends of the insulating members 86 are fixed. The movable bodies are moved in the same direction, so that the insulating members 86 are unwound in the same feeding direction from the two rolls 90. At this time, the insulating members 86, which are unwound from the two rolls 90, face each other while receiving a predetermined tension.

A first grasping mechanism 120, which grasps a magnet body 82, is placed at a position that is separated in the feeding direction from the two drums 110. The first grasping mechanism 120 grasps the plate-shaped magnet body 82 such that the magnet body 82 is parallel with the feeding direction. Also, the first grasping mechanism 120 grasps the magnet body 82 such that the direction along the short sides of the magnet body 82 agrees with the feeding direction. A second grasping mechanism 130 is arranged in the vicinity of the first grasping mechanism 120. The second grasping mechanism 130 grasps the magnet body 82 together with the insulating members 86 from above and below. A cutting mechanism 140, which cuts the insulating members 86, is arranged between the two drums 110 and the first grasping mechanism 120.

In the arrangement step S20, the unwinding mechanism unwinds the insulating members 86 from the two rolls 90. The insulating member 86 that is unwound from the upper roll 90 is arranged on the upper surface, which is a first surface, of the magnet body 82 grasped by the first grasping mechanism 120. In this state, the first surface of the magnet body 82 is entirely covered with the insulating member 86. Likewise, the insulating member 86 that is unwound from the lower roll 90 is arranged on the lower surface, which is a second surface, of the magnet body 82. In this state, the second surface of the magnet body 82 is entirely covered with the insulating member 86. With the opposite surfaces of the magnet body 82 covered with the insulating members 86, the second grasping mechanism 130 grasps the magnet body 82 together with the insulating members 86 from above and below. Thereafter, the cutting mechanism 140 cuts the upper and lower insulating members 86 at a position between the magnet body 82 and the two drums 110. In this manner, an intermediate 88 is fabricated, which includes the magnet body 82 and the insulating members 86 arranged on the opposite surfaces. In the intermediate 88, the insulating members 86 are not compression-bonded to the magnet body 82.

Figure 4:
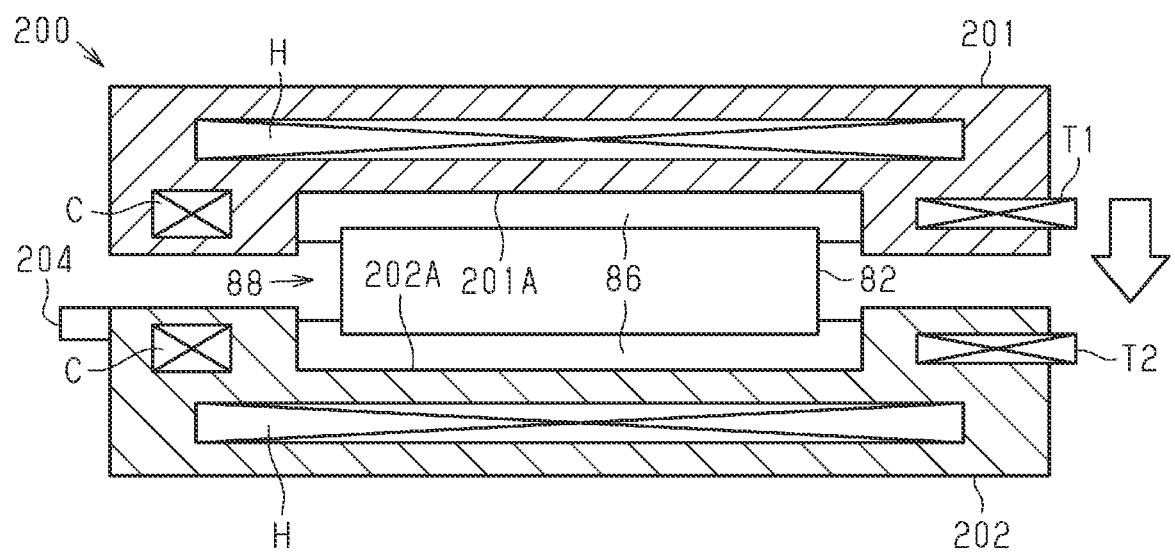
FIG. 4 is an explanatory diagram showing a thermocompression step.

As shown in FIG. 7, a thermocompression step S30 is executed after the arrangement step S20. In the thermocompression step S30, the insulating members 86 is compressed while being heated, so that the insulating members 86 are thermocompression-bonded to the magnet body 82. In the thermocompression step S30, a press die set 200 is used. As shown in FIG. 4, the press die set 200 includes an upper die 201 and a lower die 202, which are arranged to face each other. The upper die 201 and the lower die 202 are made of copper. The upper die 201 is driven by a servo motor so as to move toward or away from the lower die 202.

The upper die 201 has a compression recess 201A in the surface that faces the lower die 202. The compression recess 201A conforms to the shape of the magnet body 82. The depth of the compression recess 201A is less than half the thickness of the magnet body 82. The lower die 202 has a compression recess 202A in the surface that faces the upper die 201. The compression recess 202A is located at a position that faces the compression recess 201A of the upper die 201. The shape of the compression recess 202A of the lower die 202 is the same as the shape of the compression recess 201A of the upper die 201.

The upper die 201 and the lower die 202 both incorporate a heater H, the temperature of which can be regulated. The upper die 201 and the lower die 202 each incorporate a cooling mechanism C for cooling. The upper die 201 has an upper die temperature sensor T1, which measures the temperature of the compression recess 201A in the upper die 201. Likewise, the lower die 202 has a lower die temperature sensor T2, which measures the temperature of the compression recess 202A in the lower die 202. The upper die temperature sensor T1 and the lower die temperature sensor T2 each include, for example, a thermocouple. The press die set 200 further includes a load sensor 204, which detects the pressure applied to a pressed object by the upper die 201 and the lower die 202. The load sensor 204 includes, for example, a load cell. For the illustrative purposes, the load sensor 204 is shown on a side surface of the lower die 202 in FIG. 4.

In the thermocompression step S30, the intermediate 88, which has been fabricated in the arrangement step S20, is arranged in the compression recess 202A of the lower die 202, and the press die set 200 is driven in this state. The intermediate 88 is arranged such that the insulating member 86 that covers the second surface of the magnet body 82 faces the bottom surface of the compression recess 202A. When the press die set 200 is driven such that the upper die 201 approaches the lower die 202 as indicated by the arrow in FIG. 4, the insulating member 86 that covers the first surface of the magnet body 82 is held between the first surface of the magnet body 82 and the bottom surface of the compression recess 201A of the upper die 201. Also, the insulating member 86 that covers the second surface of the magnet body 82 is held between the second surface of the magnet body 82 and the bottom surface of the compression recess 202A of the lower die 202. In this state, the positions of the upper die 201 and the lower die 202 are adjusted such that the upper and lower insulating members 86 are compressed with a specified load N. The load applied to the upper and lower insulating members 86 is monitored using the load sensor 204. The specified load N is greater than or equal to the load required to elastically compress the glass fiber of the insulating members 86. The specified load N has been determined through experiments so as to be less than the minimum load that breaks the glass fiber.

The upper die 201 and the lower die 202 are heated by the heaters H. The temperature of the compression recess 201A of the upper die 201 is regulated to a first specified temperature Z1. The temperature of the compression recess 201A is monitored using the upper die temperature sensor T1. Also, the temperature of the compression recess 202A of the lower die 202 is regulated to the first specified temperature Z1. The temperature of the compression recess 202A is monitored using the lower die temperature sensor T2. The first specified temperature Z1 is set to be higher than or equal to the glass transition temperature of polyetherimide, which forms the insulating members 86, and lower than the temperature at which the polyetherimide evaporates. In the present embodiment, the first specified temperature Z1 is set to be slightly higher than the glass transition temperature of polyetherimide.

The insulating members 86 are compressed while being heated as described above for a first specified time L1. The first specified time L1 has been determined through experiments as an amount of time required for polyetherimide to be softened to such an extent that the glass fiber of the insulating members 86 is elastically compressed in a state in which the insulating members 86 are at the first specified temperature Z1.

Thereafter, the temperature of the upper die 201 and the lower die 202 are lowered while the insulating members 86 keep being compressed. At this time, the cooling may be promoted by the cooling mechanisms C incorporated in the press die set 200. The temperature of the compression recess 201A of the upper die 201 is regulated to a second specified temperature Z2. Also, the temperature of the compression recess 202A of the lower die 202 is regulated to the second specified temperature Z2. The second specified temperature Z2 is set to be lower than the glass transition temperature of polyetherimide. In the present embodiment, the second specified temperature Z2 is slightly lower than the glass transition temperature of polyetherimide.

The compression recess 201A of the upper die 201 and the compression recess 202A of the lower die 202 are maintained at the second specified temperature Z2 with the insulating members 86 being compressed for a second specified time L2. The second specified time L2 has been determined through experiments as an amount of time required for polyetherimide of the insulating members 86 to be cured in a state in which the insulating members 86 are at the second specified temperature Z2.

Thereafter, the upper die 201 is moved away from the lower die 202. A completed magnet 80 is located in the compression recess 202A of the lower die 202, and the magnet 80 includes the magnet body 82 with the insulating members 86 thermocompression-bonded to the opposite surfaces. At this time, the inorganic fiber of the insulating members 86 is elastically compressed. If the insulating members 86 have unnecessary parts, which for example, extend off the surfaces of the magnet body 82, the unnecessary parts are trimmed with a cutter or the like.

Figure 5:
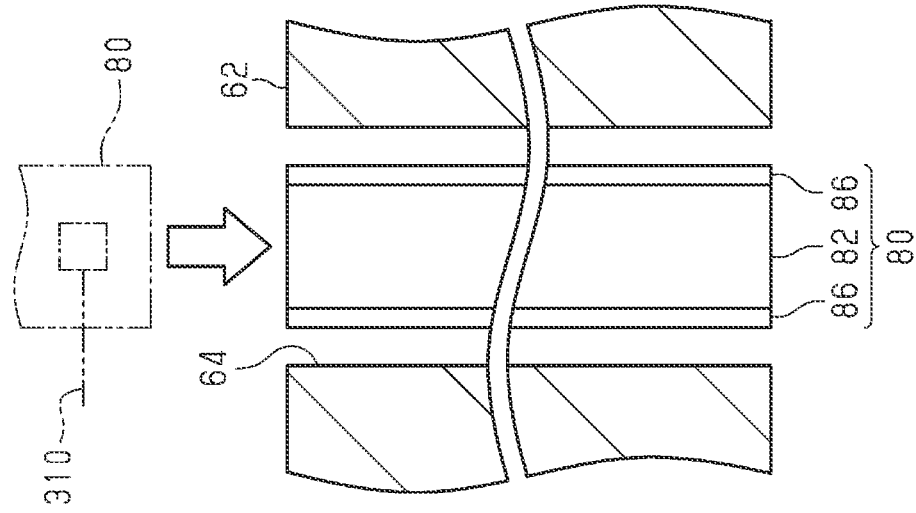
FIG. 5 is an explanatory diagram showing an insertion step.

As shown in FIG. 7, an insertion step S40 is executed after the thermocompression step S30. In the insertion step S40, the magnets 80 are inserted into the corresponding slots 64 of the rotor core 62. An insertion apparatus is used in the insertion step S40. The insertion apparatus includes a holding mechanism, on which the rotor core 62 is placed. Also, as shown in FIG. 5, the insertion apparatus includes an insertion mechanism 310, which positions a magnet 80 with respect to a slot 64 of the rotor core 62 and inserts the magnet 80 into the slot 64. At the stage at which the insertion step S40 is executed, the magnets 80 corresponding to the respective slots 64 of the rotor core 62 have been manufactured through the arrangement step S20 and the thermocompression step S30.

In the insertion step S40, the rotor core 62 is placed on the holding mechanism with one opening of each slot 64 closed with a cover or the like. Then, as indicated by the arrow in FIG. 5, the insertion mechanism 310 inserts a magnet 80 into each slot 64 from the other opening of the slot 64. The magnet 80 is inserted into the slot 64 with the insulating members 86 on the opposite surfaces caused to face the opposite inner surfaces in the width direction of the slot 64.

At the time when the magnet 80 is manufactured through the thermocompression step S30, the insulating members 86 of the magnet 80 are in a compressed state in the thickness direction of the magnet 80 due to the thermocompression, as will be discussed below the operation section, Thus, the thickness of the magnet 80 including the insulating members 86 is less than the dimension of the slot 64 in the width direction in the rotor core 62. Therefore, when the magnet 80 is inserted into the slot 64 in the insertion step S40, the magnet 80 is smoothly moved into the slot 64.

As shown in FIG. 7, a fixing step S50 is executed after the insertion step S40. In the fixing step S50, the magnets 80 are fixed to the rotor core 62. In the fixing step S50, a furnace, the temperature of which can be regulated, is used. Specifically, in the fixing step S50, the rotor core 62 with the magnets 80 inserted into the respective slots 64 is placed in the furnace and heated. The temperature inside the furnace is regulated to a third specified temperature Z3. The third specified temperature Z3 is set to be higher than or equal to the glass transition temperature of polyetherimide, which forms the insulating members 86, and lower than the temperature at which the polyetherimide evaporates. In the present embodiment, the third specified temperature Z3 is set to be equal to the first specified temperature Z1.

The rotor core 62 is heated in the furnace for a third specified time L3. The third specified time L3 has been determined through experiments as an amount of time required for polyetherimide to be sufficiently softened to such an extent that the glass fiber of the insulating members 86 restores elasticity in a state in which the insulating members 86 are at the third specified temperature Z3. When the rotor core 62 is heated for the third specified time L3, the rotor core 62 is taken out from the furnace. Thereafter, the rotor core 62 is brought back to room temperature. The rotor 60 is thus completed.

An operation of the present embodiment will now be described.

In the thermocompression step S30, the compression recess 201A of the upper die 201 and the compression recess 202A of the lower die 202 are heated to a temperature higher than the glass transition temperature of polyetherimide. This softens the polyetherimide of the insulating members 86 covering the opposite surfaces of the magnet body 82. In the thermocompression step S30, the insulating members 86 are compressed. This warps the glass fiber of the insulating members 86, so that the insulating members 86 are in an elastically compressed state. Further, in the thermocompression step S30, the compression recess 201A of the upper die 201 and the compression recess 202A of the lower die 202 are cooled to a temperature lower than the glass transition temperature of polyetherimide, while maintaining the compressed state of the insulating members 86. This joins the insulating members 86 to the surfaces of the magnet body 82 with the glass fiber being in the elastically compressed state.

In the fixing step S50, the insulating members 86 are heated again to a temperature higher than the glass transition temperature of polyetherimide. This softens the polyetherimide of the insulating members 86 again. Then, the glass fiber, which has been elastically compressed, restores elasticity. Accordingly, the insulating members 86 expand in the thickness direction of the magnet 80 (as indicated by the arrows in FIG. 6) from the state in which the glass fiber is compressed as indicated by the long-dash double-short-dash lines in FIG. 6. When the insulating members 86 expand to reach the inner surfaces of the slot 64, the friction caused by contact between the insulating members 86 and the inner surfaces of the slot 64 fix the magnet 80 in the slot 64.

The present embodiment has the following advantages.

(1) As described in the operation section, the insulating members 86 are integrated with the magnet body 82 with the glass fiber of the insulating members 86 elastically compressed. The magnet 80 is then heated again, so that the glass fiber restores elasticity. The magnet 80 is thus fixed to the rotor core 62. In this case, adhesive or plastic for molding does not need to be applied to the magnet or the rotor core.

That is, the magnets 80 are fixed to the rotor core 62 through a simple process of heating the rotor core 62, into which the magnets 80 are inserted.

(2) Since the arranging apparatus 100 unwinds the insulating members 86 from the rolls 90, the arrangement step S20 can be executed continuously. This allows multiple intermediates 88 to be manufactured efficiently.

(3) The upper die 201 and the lower die 202 of the press die set 200 are made of copper. The upper die 201 and the lower die 202 thus have a high thermal conductivity. This reduces energy loss when the insulating members 86 are thermocompression-bonded to the magnet body 82. The upper die 201 and the lower die 202 of the press die set 200 are each provided with the heater H. Accordingly, the upper die 201 and the lower die 202 can be regulated to temperatures suitable for thermocompression.

(4) For example, spray coating is known as a method of covering the surfaces of a magnet body with an insulating member. In the case of spray coating, some of insulating material is not applied to the magnet body, but scattered. The yield factor of the insulating material is therefore relatively low. In this respect, if the sheets of the insulating members 86 are cut accurately in the arrangement step S20, surplus of the insulating members 86 is not generated in the present embodiment. This increases the yield factor of the insulating members 86.

The present embodiment may be modified as follows. The present embodiment and the following modifications can be combined as long as the combined modifications remain technically consistent with each other.

The configuration of the arranging apparatus 100, which is used in the arrangement step S20, is not limited to the example in the above-described embodiment. The arranging apparatus 100 may have any configuration as long as it is capable of arranging the insulating members 86 on the surfaces of the magnet body 82.

In the arranging apparatus 100, the first grasping mechanism 120 and the second grasping mechanism 130 may be omitted, and operations performed by the first grasping mechanism 120 and the second grasping mechanism 130 may be performed manually by a worker.

The method of arranging the insulating members 86 on the opposite surfaces of the magnet body 82 in the arrangement step S20 is not limited to the example in the above-described embodiment. In the above-described embodiment, the insulating members 86 are simultaneously arranged on the opposite surfaces of the magnet body 82. However, the insulating members 86 may be arranged in sequence on the first surface and on the second surface of the magnet body 82.

Adhesive or double-sided adhesive tape may be applied to the surfaces of the magnet body 82 before arranging the insulating members 86 on the surfaces of the magnet body 82 in the arrangement step S20. This allows the insulating members 86 to be tentatively fastened when arranged on the surfaces of the magnet body 82. In this case, the bonding force of the adhesive or the double-sided adhesive tape does not need to be significantly strong since it suffices if the insulating members 86 can be tentatively fastened, and the surfaces of the magnet bodies 82 do not need to be entirely bonded to the insulating members 86.

In the arrangement step S20, multiple magnets 80 may be arranged in the feeding direction of the insulating members 86, and the unwound amount of the insulating members 86 may be increased, accordingly. In this case, the insulating members 86 are arranged simultaneously on the surfaces of the multiple magnets 80. The insulating members 86 may be cut between the adjacent magnets 80.

In the arrangement step S20, the rolls 90 do not necessarily need to be used. Insulating members 86 having dimensions corresponding to one magnet body 82 may be prepared in the preparation step S10, and the insulating members 86 may be arranged on the surfaces of the magnet body 82.

In the arrangement step S20, the insulating member 86 may be arranged on one surface of the magnet body 82. In this case, the heater H in the upper die 201 or the lower die 202 is unnecessary. One of the cooling mechanisms C is also unnecessary. In a case in which at least one of the opposite surfaces of the magnet body 82 is provided with the insulating member 86, the insulating member 86 may be arranged only on a part of the surface.

The configuration of the press die set 200, which is used in the thermocompression step S30, is not limited to the example in the above-described embodiment. The press die set 200 may have any configuration as long as it is capable of heating and compressing the insulating members 86 simultaneously. For example, the mechanism that drives the press die set 200 may be changed from the example in the above-described embodiment. In a case in which the mechanism that drives the press die set 200 is changed, the press die set 200 may be driven using hydraulic pressure. Alternatively, a hand press, with which an object is compressed manually, may be used.

In a case in which one of the heaters H in the upper die 201 and the lower die 202 is unnecessary as described above, the unnecessary heater H may be omitted. The same applies to the unnecessary cooling mechanism C. Alternatively, the cooling mechanisms C may be omitted from both of the upper die 201 and the lower die 202. In this case, the press die set 200 can be cooled by being left unattended for a certain amount of time after the heaters H are stopped.

The material for the upper die 201 and the lower die 202 is not limited to the example in the above-described embodiment. For example, the upper die 201 and the lower die 202 may be made of iron. The upper die 201 and the lower die 202 may be made of different materials from each other.

The first specified temperature Z1 of the thermocompression step S30 may be significantly higher than the glass transition temperature of the thermoplastic resin fiber.

The second specified temperature Z2 of the thermocompression step S30 may be significantly lower than the glass transition temperature of the thermoplastic resin fiber. The second specified temperature Z2 may be room temperature, for example.

The method of inserting the magnet 80 into the slots 64 in the insertion step S40 is not limited to the example in the above-described embodiment. For example, the magnets 80 may be manually inserted into the slots 64 using a jig.

The third specified temperature Z3 of the fixing step S50 may be different from the first specified temperature Z1 of the thermocompression step S30.

The method of heating the insulating members 86 in the fixing step S50 is not limited to the example in the above-described embodiment. For example, high frequency induction heating may be performed. That is, the rotor core 62, which accommodates the magnets 80 in the slots 64, is arranged inside the coil for high frequency induction heating. The coil is then energized to generate a magnetic field, so that the insulating members 86 are heated together with the rotor core 62.

The type of permanent magnets used as the magnet bodies 82 is not limited to the example in the above-described embodiment. Any type of permanent magnets may be used as the magnet bodies 82. Examples of permanent magnets used as the magnet bodies 82 include ferrite magnets, alnico magnets, samarium-cobalt magnets, praseodymium magnets, samarium-iron-nitrogen magnets, platinum magnets, and cerium cobalt magnets.

The shape of the magnet bodies 82 is not limited to the example in the above-described embodiment. The magnet bodies 82 may have any shape as long as the magnet bodies 82 can be accommodated in the slots 64. For example, the surface of each magnet body 82 may be curved.

The type of thermoplastic resin fiber for the insulating members 86 is not limited to the example in the above-described embodiment. The thermoplastic resin fiber, for example, may be polyethersulfone or polysulfone. The rotor 60 may be heated to a high temperature during the use of the motor 50. Also, depending on the usage environment of the motor 50, the rotor 60 may be splashed with water and oil, or receive an external force. Taking these factors into consideration, the thermoplastic resin fiber preferably has a high heat resistance, a high water resistance, a high oil resistance, a high creep resistance, a high thermal shock resistance, and a high insulation property.

When the type of the thermoplastic resin fiber of the insulating members 86 is changed as in the above-described modification, the first specified temperature Z1 of the thermocompression step S30 simply needs to be changed in accordance with the glass transition temperature of the employed thermoplastic resin fiber. The first specified temperature Z1 may be any temperature that is higher than or equal to the glass transition temperature of the employed thermoplastic resin fiber, and lower than the temperature at which the employed thermoplastic resin fiber evaporates. The same applies to the third specified temperature Z3 of the fixing step S50.

As in the above-described modification, the second specified temperature Z2 simply needs to be changed in accordance with the glass transition temperature of the employed thermoplastic resin fiber. The second specified temperature Z2 may be any temperature that is lower than the glass transition temperature of the employed thermoplastic resin fiber.

The type of the inorganic fiber of the insulating members 86 is not limited to the example in the above-described embodiment. Examples of the inorganic fiber include rock wool, carbon fiber, alumina fiber, calcium silicate fiber, potassium titanate fiber, and ceramic fiber.

When the type of the inorganic fiber of the insulating members 86 is changed as in the above-described modification, the specified load N of the thermocompression step S30 simply needs to be changed in accordance with the employed inorganic fiber. The specified load N may be any value that is greater than or equal to the minimum load required to elastically compress the employed inorganic fiber, and less than the minimum load that breaks the employed inorganic fiber.

When the type of the thermoplastic resin fiber of the insulating members 86 is changed or when the type of the inorganic fiber is changed, the first specified time L1 of the thermocompression step S30 simply needs to be changed in accordance with the combination of the thermoplastic resin fiber and the inorganic fiber. The first specified time L1 may be set to any amount of time that is required for the thermoplastic resin fiber to be sufficiently softened to such an extent that the inorganic fiber of the insulating members 86 is elastically compressed in a state in which the insulating members 86 are at the first specified temperature Z1. Like the first specified time L1, the second specified time L2 of the thermocompression step S30 and the third specified time L3 of the fixing step S50 may be changed in accordance with the combination of the thermoplastic resin fiber and the inorganic fiber.

The arrangement of the slots 64 in the rotor core 62 is not limited to the example in the above-described embodiment. The slots 64 do not necessarily need to be arranged to form the shapes of the letter V, but may be arranged along the circumference of the rotor core 62, for example. Any arrangement of the slots 64 may be employed as long as the magnets 80 are arranged such that the north poles and the south poles are arranged alternately in the circumferential direction of the rotor core 62.

The number of the slots 64 in the rotor core 62 is not limited to the example in the above-described embodiment. The number of the slots 64 may be changed as long as the magnetic poles are properly arranged as in the above-described modification.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A method of manufacturing a magnet, the magnet including a magnet body having a surface covered with an insulating member, the method comprising:
   an arrangement step that arranges, on the surface of the magnet body, the sheet-shaped insulating member including a thermoplastic resin fiber and an inorganic fiber; and
   a thermocompression step that compresses the insulating member while heating the insulating member to a temperature higher than or equal to a glass transition temperature of the thermoplastic resin fiber, thereby thermocompression-bonding the insulating member to the magnet body in a state in which the inorganic fiber is elastically compressed, and
   wherein the sheet-shaped insulating member includes insulating members unwound from two rolls that are made by rolling up the insulating members, and
   the arrangement step arranges the insulating member unwound from one of the rolls on a first surface of the magnet body, and arranges the insulating member unwound from the other roll on a second surface of the magnet body.

2. A method of manufacturing a rotor, wherein
the rotor includes:
a rotor core having a slot; and
a magnet that is arranged in the slot and includes a magnet body having a surface covered with an insulating member, the method comprising:
an arrangement step that arranges, on the surface of the magnet body, the sheet-shaped insulating member including a thermoplastic resin fiber and an inorganic fiber;
a thermocompression step that compresses the insulating member while heating the insulating member to a temperature higher than or equal to a glass transition temperature of the thermoplastic resin fiber, thereby thermocompression-bonding the insulating member to the magnet body in a state in which the inorganic fiber is elastically compressed, so as to form the magnet; and
a fixing step that heats the magnet arranged in the slot to a temperature higher than or equal to the glass transition temperature, thereby restoring elasticity of the inorganic fiber, so as to fix the magnet to the rotor core, and
wherein the sheet-shaped insulating member includes insulating members unwound from two rolls that are made by rolling up the insulating members, and
the arrangement step arranges the insulating member unwound from one of the rolls on a first surface of the magnet body, and arranges the insulating member unwound from the other roll on a second surface of the magnet body.

* * * * *